(12) United States Patent
Clarke et al.

(10) Patent No.: US 10,415,373 B2
(45) Date of Patent: Sep. 17, 2019

(54) SUBMERSIBLE PUMP MONITORING

(71) Applicant: Silixa Ltd., Elstree Hertfordshire (GB)

(72) Inventors: Andrew Clarke, Elstree (GB); Daniel Finfer, Elstree (GB); Veronique Mahue, Elstree (GB); Tom Parker, Elstree (GB); Mahmoud Farhadiroushan, Elstree (GB)

(73) Assignee: Silixa Ltd., Elstree Hertfordshire (GB)

( * ) Notice: Subject to any disclaimer, the term of this patent is extended or adjusted under 35 U.S.C. 154(b) by 0 days.

(21) Appl. No.: 15/122,038

(22) PCT Filed: Mar. 2, 2015

(86) PCT No.: PCT/GB2015/050600
§ 371 (c)(1),
(2) Date: Aug. 26, 2016

(87) PCT Pub. No.: WO2015/128680
PCT Pub. Date: Sep. 3, 2015

(65) Prior Publication Data
US 2017/0016312 A1  Jan. 19, 2017

(30) Foreign Application Priority Data
Feb. 28, 2014 (GB) .................................. 1403626.3

(51) Int. Cl.
*E21B 47/04* (2012.01)
*E21B 47/00* (2012.01)
(Continued)

(52) U.S. Cl.
CPC ........ *E21B 47/0007* (2013.01); *E21B 43/128* (2013.01); *E21B 47/042* (2013.01);
(Continued)

(58) Field of Classification Search
USPC ...................................................... 385/12–13
See application file for complete search history.

(56) References Cited

U.S. PATENT DOCUMENTS

| 7,246,662 B2 * | 7/2007 | Jabusch | ............... E21B 43/006 166/105 |
| 2002/0109080 A1 * | 8/2002 | Tubel | ..................... E21B 23/03 250/227.14 |

(Continued)

FOREIGN PATENT DOCUMENTS

| GB | 2397885 A | 8/2004 |
| WO | WO-2007140134 A2 | 12/2007 |

(Continued)

OTHER PUBLICATIONS

C. Alianic et al., Distributed Acoustic Sensing for ESP Understanding and Surveillance, 2013, Society of Petroleum Engineers, SPE# 167501, pp. 1-10.*

(Continued)

*Primary Examiner* — Muhammad N Edun
*Assistant Examiner* — Jerold B Murphy
(74) *Attorney, Agent, or Firm* — Honigman LLP; Matthew H. Szalach; Jonathan P. O'Brien

(57) ABSTRACT

In order to address the above noted problems, embodiments of the present invention use distributed acoustic sensing to monitor the fluid level in an ESP activated well so as to monitor the condition and performance of the ESP. Embodiments of the invention use the ESP as an acoustic source in order to monitor the annulus fluid level within the well and to monitor the frequency of the ESP. Additionally, embodiments of the present invention may use distributed acoustic sensing to monitor the flow rates of the production fluid above and below the ESP to determine the pump's efficiency. In particular, some embodiments utilize one or more optical fibers to measure the acoustic waves generated by the (Continued)

ESP, wherein the fiber cabling has already been deployed along the length of the well. As such, the present invention is a non-invasive, in-situ method for monitoring the condition and performance of an ESP.

7 Claims, 8 Drawing Sheets

(51) Int. Cl.
*E21B 47/10* (2012.01)
*E21B 23/03* (2006.01)
*E21B 43/12* (2006.01)
*E21B 47/12* (2012.01)
*G01H 9/00* (2006.01)
*G01F 23/296* (2006.01)

(52) U.S. Cl.
CPC .......... *E21B 47/101* (2013.01); *E21B 47/123* (2013.01); *G01F 23/2968* (2013.01); *G01H 9/004* (2013.01)

(56) References Cited

U.S. PATENT DOCUMENTS

| | | | |
|---|---|---|---|
| 2003/0094281 A1* | 5/2003 | Tubel | E21B 47/00 166/250.03 |
| 2007/0272406 A1* | 11/2007 | McCoy | E21B 43/126 166/250.01 |
| 2012/0060615 A1 | 3/2012 | Farhadiroushan et al. | |
| 2012/0287749 A1 | 11/2012 | Kutlik et al. | |
| 2013/0021874 A1 | 1/2013 | Hartog et al. | |
| 2014/0060822 A1 | 3/2014 | Segal | |
| 2014/0216151 A1* | 8/2014 | Godfrey | E21B 47/10 73/152.32 |

FOREIGN PATENT DOCUMENTS

| | | |
|---|---|---|
| WO | WO-2013008035 A2 | 1/2013 |
| WO | WO-2013045941 A1 | 4/2013 |
| WO | WO-2014099066 A1 | 6/2014 |
| WO | WO-2015117051 A1 | 8/2015 |

OTHER PUBLICATIONS

Intellectual Property Office, Patents Act 1977: Search Report under Section 17(5) for GB Application No. 1403626.3, dated Aug. 11, 2014.

C. Allanic et al., "Distributed Acoustic Sensing for ESP Understanding and Surveillance (SPE 167501)", SPE Middle East Intelligent Energy Conference and Exhibition, Dubai, UAE, Oct. 28-30, 2013, pp. 1-10.

International Searching Authority, International Search Report and Written Opinion for PCT Application No. PCT/GB2015/050600, dated Jun. 22, 2015.

European Patent Office, Communication pursuant to Article 94(3) EPC for Application No. 15707763.7, dated Jul. 5, 2017.

Intellectual Property Office, Patents Act 1977: Combined Search and Examination Report under Sections 17 and 18(3) for Application No. GB1711485.1, dated Aug. 22, 2017.

Intellectual Property Office, Patents Act 1977: Combined Search and Examination Report under Sections 17 and 18(3) for GB Application No. 1800526.4, dated Feb. 22, 2018.

* cited by examiner

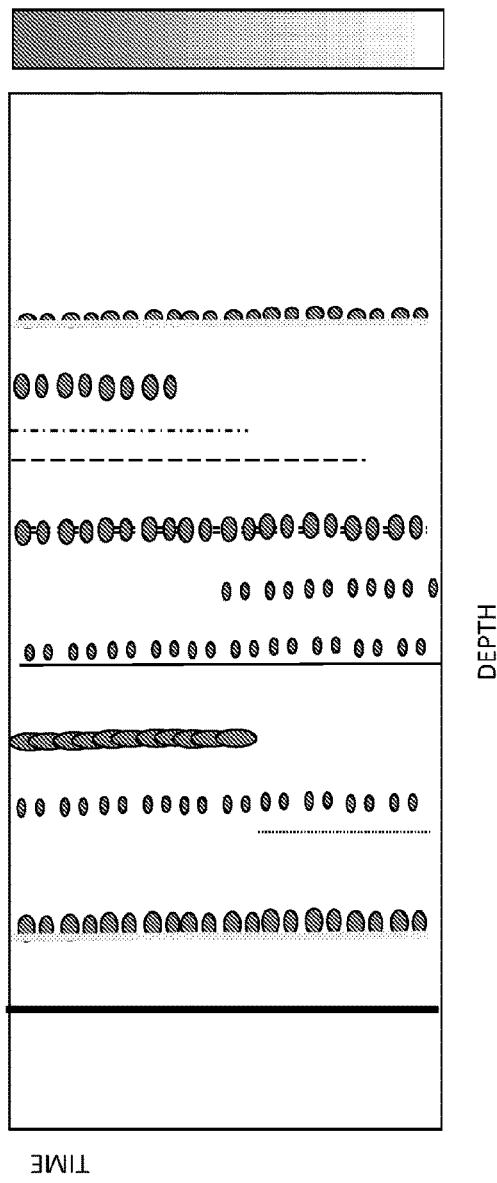
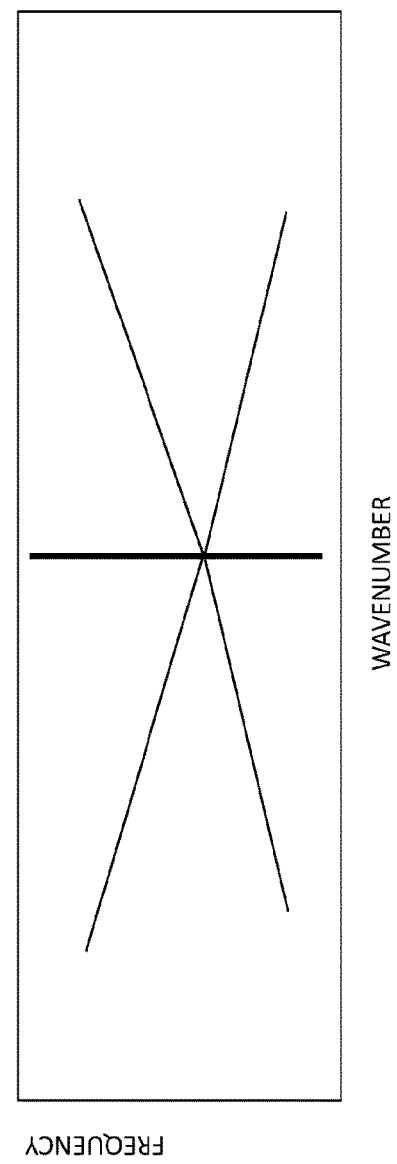
Figure 6
Figure 7

SUBMERSIBLE PUMP MONITORING

CROSS-REFERENCE TO RELATED APPLICATIONS

This application claims priority under 35 U.S.C. § 371 to Patent Cooperation Treaty Application No. PCT/GB2015/050600, filed Mar. 2, 2015, which claims priority to GB Application No. 1403626.3, filed Feb. 28, 2014, the entire contents of which are incorporated herein by reference.

TECHNICAL FIELD

Some embodiments of the invention relate to the monitoring of submersible pumps, such as Electrical Submersible Pumps (ESPs), deployed in-well. In addition, some embodiments of the present invention relate to fluid level detection in oil wells using an optical fibre based distributed acoustic sensor.

BACKGROUND TO THE INVENTION AND PRIOR ART

Artificial lift methods are commonly used to increase the flow rates of liquids in production wells that have insufficient pressure to bring the production fluids to the surface. This is often the case, for example, for crude oil or a mature well wherein the well pressure has decreased. The artificial lift methods used include injecting gas or water further down the well, or introducing a mechanical device inside the well to artificially increase the well pressure, for example, an Electrical Submersible Pump (ESP).

Where a mechanical device such as an ESP is deployed inside a well, it is necessary to monitor the condition and performance of the device. In the case of an ESP, it is important to monitor the fluid level in the well to ensure that the ESP is surrounded by liquid to prevent it from overheating or running dry, which can lead to extensive pump damage and considerable repair costs for the pump operators. Such monitoring is often done using acoustic pulse fluid level measurement techniques, wherein an acoustic pulse or wave is transmitted into a well via an acoustic wave generation tool.

Known systems for acoustic pulse fluid level monitoring include the 'Model M', manufactured by Echometer Co., of Texas, USA, which utilises acoustics to determine the distance from the surface to the liquid level in the casing annulus of a well. A pressure pulse is generated from a gas-gun or microphone attachment that is connected to the surface casing annulus valve. The pressure pulse travels down the casing annulus gas and is reflected by collars, the liquid level and other obstructions. A microphone in the wellhead attachment converts the pressure pulses into electrical signals that are amplified, filtered and recorded on a strip of paper. The record shows the number of tubing collars from the surface to the liquid level and hence the liquid level depth can be determined.

Acoustic reflections can also be generated and monitored using a surface noise source such as a pressure pulse gun and surface microphone. For example, the Acoustic Fluid Logger IV System manufactured by Sage Technologies, Inc, of Texas, USA, includes a pressure pulse gun charged with compressed gas. When the gun is fired, reflections from the liquid are registered by a microphone inside the gas gun and transmitted to a fluid logger. This data is then transferred to a computer for analysis.

Methods of fluid level detection such as those described above require extensive equipment to firstly generate the acoustic waves, secondly to detect the acoustic reflections from the fluid and then to analyse the measured data. This can be costly, time intensive and disruptive to the operation of the oil well. In addition, such techniques only provide measurements at discrete points in time, and are not conducive to continuous or almost-continuous monitoring. A more convenient and economical way of detecting the fluid level in a well using an acoustic noise source is therefore required, and preferably one which can be used substantially continuously.

Fiber optic based distributed acoustic sensors are known in the art. Such systems employ fiber optic cables to provide distributed acoustic sensing whereby the optical fiber cable acts as a string of discrete acoustic sensors, and an opto-electronic system measures and processes a backscattered signal from a light pulse sent along the fiber. The operation of such a system is described next.

A pulse of light is sent into the optical fiber, and as the pulse travels along the fiber a small amount of light is naturally back scattered from along the length of the fiber by Rayleigh, Brilliouin and Raman scattering mechanisms. The back scattered light is carried back towards the source where the returning signal is measured against time, allowing measurements in the amplitude, frequency and phase of the back scattered light to be determined. If an acoustic wave is incident upon the cable, the glass structure of the optical fiber is caused to contract and expand within the incident vibro-acoustic field of the acoustic wave, consequently varying the optical path lengths between the back scattered light scattered from different locations along the fibre. This variation in path length is measured as a relative phase change, allowing optical phase angle data to be used in combination with backscatter return timing information to provide information relating to the incident acoustic waves along the length of the fiber.

Optical fibre based distributed acoustic sensors (DAS) that operate in accordance with the above described principles are known in the art. One high performance example is the iDAS™, available from Silixa Limited, of Elstree, UK. Further details of the operation of a suitable DAS are given in WO2010/0136809 and WO2010/136810, which also disclose that distributed acoustic sensors may be used for in-well applications, in that the acoustic noise profile can be used to measure the flow by noise logging at every location along the well. In addition, the noise spectrum can be used to identify the phase of the fluid.

SUMMARY OF INVENTION

In order to address the above noted problems, embodiments of the present invention use distributed acoustic sensing to monitor the fluid level in an ESP activated well so as to monitor the condition and performance of the ESP. Embodiments of the invention use the ESP as an acoustic source in order to monitor the annulus fluid level within the well, and also to monitor the frequency of the ESP. Additionally, embodiments of the present invention may use distributed acoustic sensing to monitor the flow rates of the production fluid above and below the ESP to determine the pump's efficiency. In particular, some embodiments utilise one or more optical fibers to measure the acoustic waves generated by the ESP, wherein the fiber cabling has already been deployed along the length of the well. As such, the present invention is a non-invasive, in-situ method for monitoring the condition and performance of an ESP.

In addition, some embodiments of the invention are able to determine the in-well fluid level whether an ESP is present or not, for the purposes, for example of determining quality measures relating to the well, such as Productivity Index. The same techniques as are used to monitor the fluid level in the vicinity of an ESP may be employed, as will be described, although a different source of acoustic illumination is required where an ESP is absent.

In view of the above, from one aspect an embodiment of the invention provides a method of in-well fluid level detection around an in-well submersible pump, comprising using an optical fiber distributed acoustic sensor to measure the propagation of acoustic waves within fluid in the vicinity of a submersible pump deployed in-well, the measuring including detecting one or more reflections of an acoustic wave to determine the location of a fluid interface within the well with respect to the submersible pump.

In another embodiment, there is provided a method of in-well fluid level detection around an in-well submersible pump, comprising using an optical fiber distributed acoustic sensor to measure the propagation of acoustic waves within fluid in the vicinity of a submersible pump deployed in-well, the measuring including measuring the speed of sound of the acoustic waves to determine the location of a fluid interface within the well with respect to the submersible pump. In one embodiment, determining the location of the fluid interface in the well comprises detecting a change in the speed of sound measurements.

From another aspect there is provided a method of in-well fluid level detection, comprising using an optical fiber distributed acoustic sensor to measure the propagation of acoustic waves within fluid in the well to determine the location of a fluid interface within the well. In this aspect the well need not be provided with an ESP, and one purpose of undertaking the fluid level determination is to help calculate one or more quality or operational parameters relating to the well.

In one embodiment the acoustic waves are generated by the submersible pump when in operation. In this way, the submersible pump itself is used as the acoustic illumination source to determine the fluid level in the vicinity of itself.

In one embodiment determining the location of the fluid interface in the well comprises measuring the propagation of acoustic waves from a known location of the submersible pump to the fluid interface whereby to determine the distance from the pump to the interface. Preferably the propagation of acoustic waves generated by the submersible pump are measured below and/or above the pump.

In a further embodiment the optical fiber distributed acoustic sensor is further arranged to measure one or more operating frequencies of the submersible pump. Preferably the operating frequencies are measured during the start-up and the operation of the electrical submersible pump. Moreover, preferably the optical distributed acoustic sensor detects any changes in the operating frequencies.

A further aspect of the present invention also provides a method of monitoring in-well fluid flow rate using an optical fiber distributed acoustic sensor arranged to measure the propagation of acoustic waves generated by a submersible pump deployed in-well, wherein the optical fiber distributed acoustic sensor senses acoustic energy coupled into the well from the propagating acoustic waves, and calculates the fluid flow rate in the well based on the sensed acoustic energy.

In one embodiment calculating the fluid flow rate in the well includes calculating the speed of sound in the fluid. Moreover, in further embodiments the propagation of acoustic waves generated by the electrical submersible pump may be measured below and/or above the pump.

Yet another aspect of the invention comprises a method of monitoring the operation of an in-well submersible pump, comprising using an optical fiber distributed acoustic sensor to measure one or more frequencies of operation of the in-well submersible pump.

In one embodiment the frequencies of operation are measured during start-up of the pump and/or during steady state operation of the pump. Changes in the frequencies of operation over time may also be detected. If an abrupt change in a frequency of operation of the pump is detected, or if the frequency of operation drifts outside a predetermined range, then in either case an operator may be alerted. An abrupt change in frequency, or a frequency drift outside predetermined parameters may indicate a fault with either the pump or the well, and should be investigated.

A plurality of operating frequencies of the pump may be detected simultaneously using the optical fiber distributed acoustic sensor, with appropriate Fourier transform based signal processing, as is known in the art. That is, the spectrum of the pump in operation may be determined, and any changes in the spectrum monitored. For example, a fundamental frequency of operation of the pump may be determined, and/or one or more second or higher order harmonics. The spectral position of the fundamental and/or one or more of the higher order harmonics may be monitored over time and/or for different pump rates. If the spectral position or positions of one or more of the fundamental and/or higher order harmonics changes either abruptly, or changes gradually over time so as to be outside a predetermined range of a predetermined nominal frequency or frequencies, then an operator alert may be generated, for example to alert an operator to unexpected behavior in the pump. Such unexpected behavior may be due to a fault in the pump or the well.

Different alert thresholds may be set for different changes in fundamental, harmonic, or other frequencies. For example, if the fundamental frequency changes abruptly over a short time period (say less than 5 s) then a smaller change in frequency (e.g. 5%) may be sufficient to trigger an alert than if the same change occurs over a longer time period. A rate of change of frequency may be measured, with higher rates of change leading to alerts than lower rates of change. In addition, rates of change of frequency may also be measured at the same time as relative or absolute changes in frequency, with alert thresholds being set for rates of change as well as relative (e.g. percentage threshold) or absolute (e.g. in Hz or kHz) changes in monitored frequency.

Various other features, aspects and arrangements according to embodiments of the invention will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein:

FIG. 3a is graph showing the measured acoustic signal in accordance with an embodiment of the present invention when the ESP is turned off;

FIG. 3b is graph showing the measured acoustic signal in accordance with an embodiment of the present invention when the ESP is turned on;

FIG. 6 is a drawing of an example space-time plot of the data collected by a DAS in a deployment like that of FIG. 1; and FIG. 7 is a drawing of a 2D Fourier transform (k-ω plot) of the space-time plot of FIG. 6;

DESCRIPTION OF THE EMBODIMENTS

In a particular embodiment of the invention, described here in order to provide an example of a preferred implementation of the present invention, an optical fibre distributed acoustic sensor is provided along an ESP activated well in order to detect the propagation of acoustic waves generated by the ESP, and thus monitor the annulus fluid level of the well, as will be described. In use, as known in the art, an ESP is submerged into the production fluid and used to increase the flow rate of production fluids. The ESP decreases the pressure at the bottom of the well by increasing the drawdown in order to artificially 'lift' the production fluid from its reservoir to the surface.

Figure 1:
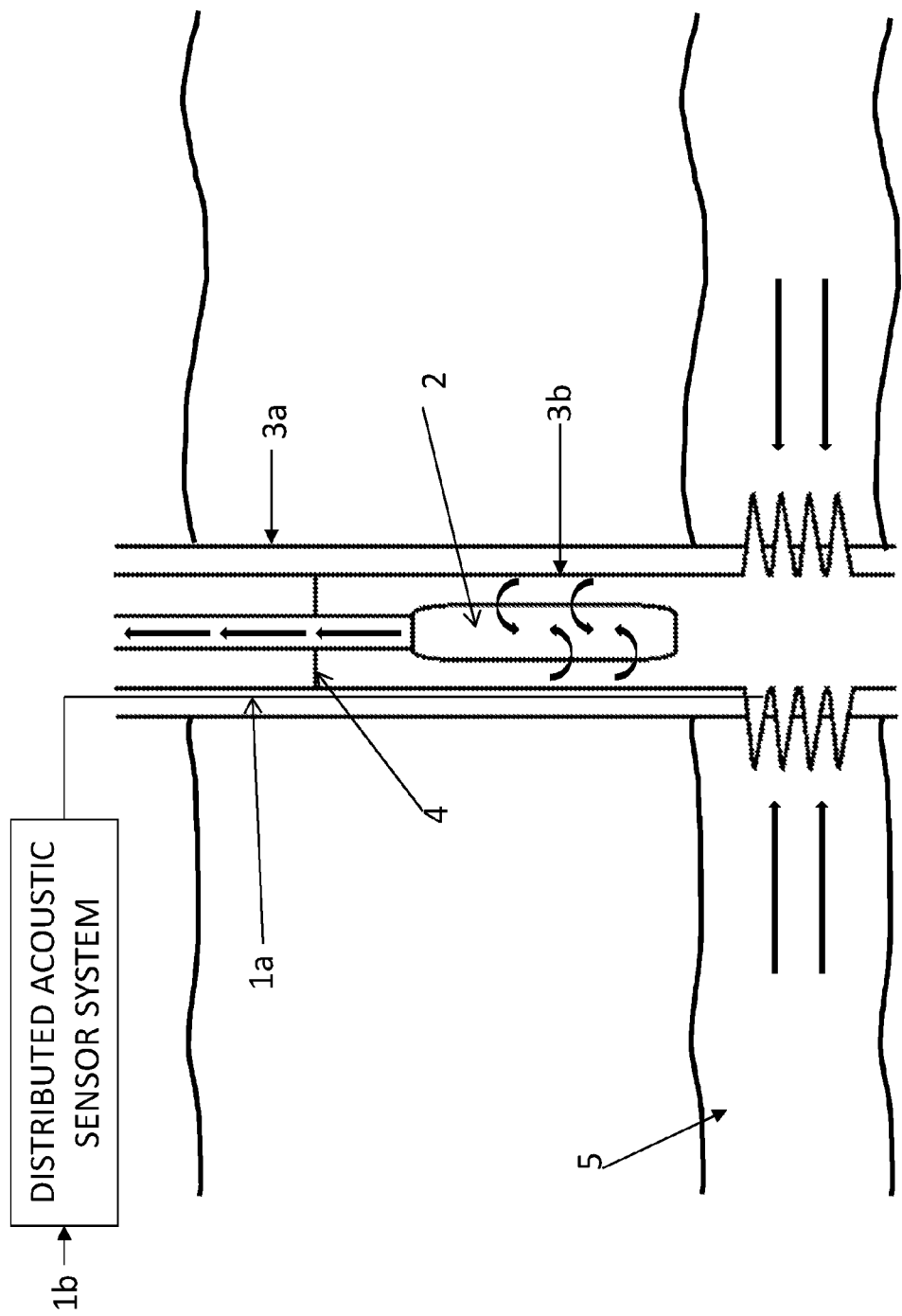
FIG. 1 is a cross-sectional view illustrating a typical in-well deployment of an ESP and optical fibre distributed acoustic sensor in accordance with an embodiment of the present invention.

FIG. 1 illustrates a typical deployment scenario for embodiments of the present invention. Here, a wellbore 3a has been drilled down into gasoline producing rock 5, and a casing 3b installed therein. During completion of the wellbore 3a, a submersible pump, such as an electrical submersible pump (ESP) 2 is inserted into the casing 3b, and moved along the casing 3b to its intended position, for example within or above the intended production zone of the well 3a. The ESP 2 is deployed within the casing 3b in order to increase the flow rate of the oil, so as to help lift the oil to the surface. The casing 3b is provided running along its outer surface with one or more optical fibres 1a as well as usually other cabling, provided for signalling, sensing or control purposes. A distributed acoustic sensing (DAS) system 1b is provided, connected to the one or more optical fibres 1a, and which may operate in a distributed acoustic sensing mode as known in the art to detect the propagation of acoustic waves generated by the ESP 2, or by other acoustic sources, within the casing 3b. The DAS is typically able to record sound incident on the cable at between 1 m and 5 m native resolution along the whole length of the cable, at frequencies up to around 100 kHz. Next generation DAS systems will likely have higher spatial and frequency resolutions, and hence the figures mentioned here are by way of example only.

Further by way of example, the DAS system may be a Silixa® iDAS™ system, the details of operation of which are available at the URL http://www.silixa.com/technology/idas/, and which is also described in our earlier patent application WO2010/0136809, any details of which that are necessary for understanding the present invention being incorporated herein by reference.

A first embodiment of the invention will now be described with respect to FIG. 4, wherein an optical fiber based DAS system is used to monitor the operation of an ESP, via condition monitoring of the noise that the ESP makes during operation. For example, the amplitude and frequency of the sound generated by an ESP is a function of the condition and power output of the ESP. By monitoring the amplitude and frequency (or more accurately frequencies) of the ESP during operation, the condition of the ESP can be ascertained, and an operator may begin to tell, particularly from changes in the frequencies produced, as to whether an ESP is beginning to fail.

Figure 2:
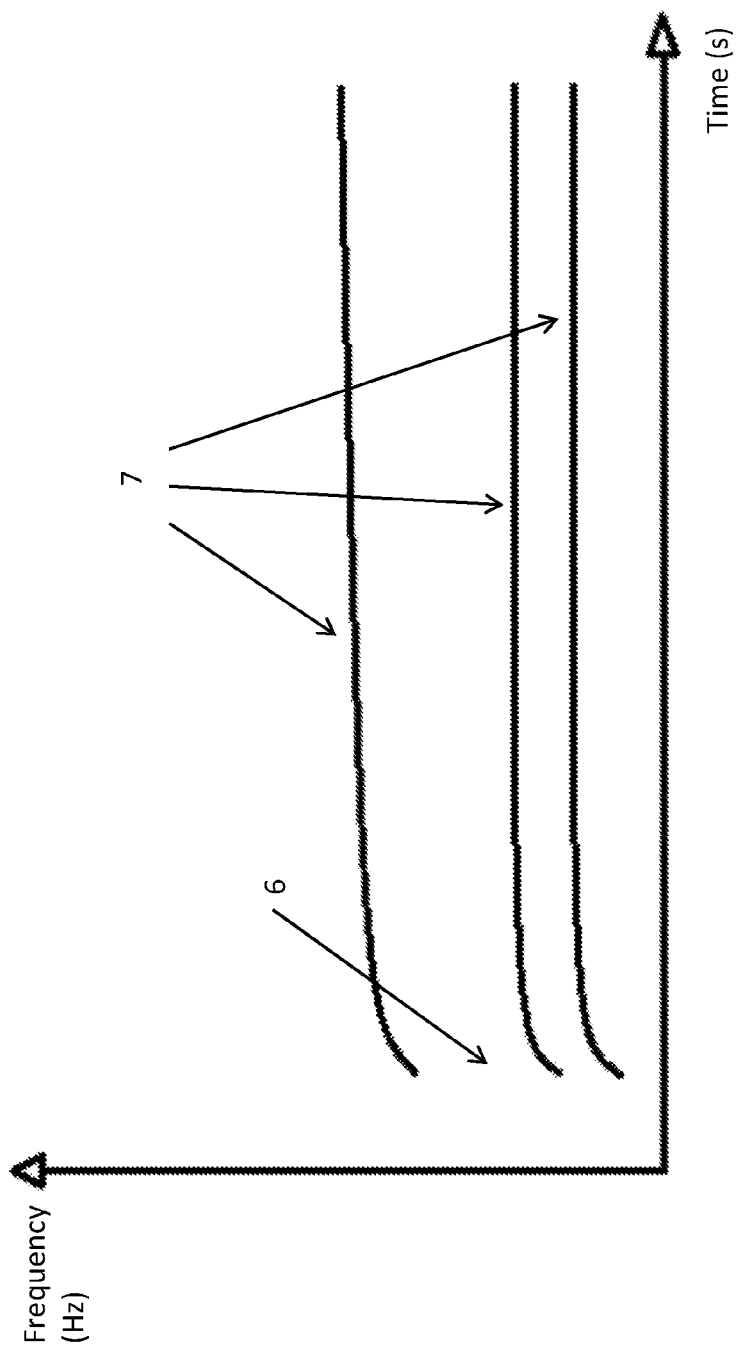
FIG. 2 is a graph plotting the frequencies of acoustic waves generated by an ESP, as measured by an optical fibre distributed acoustic sensor.
Figures 3A, 3B:
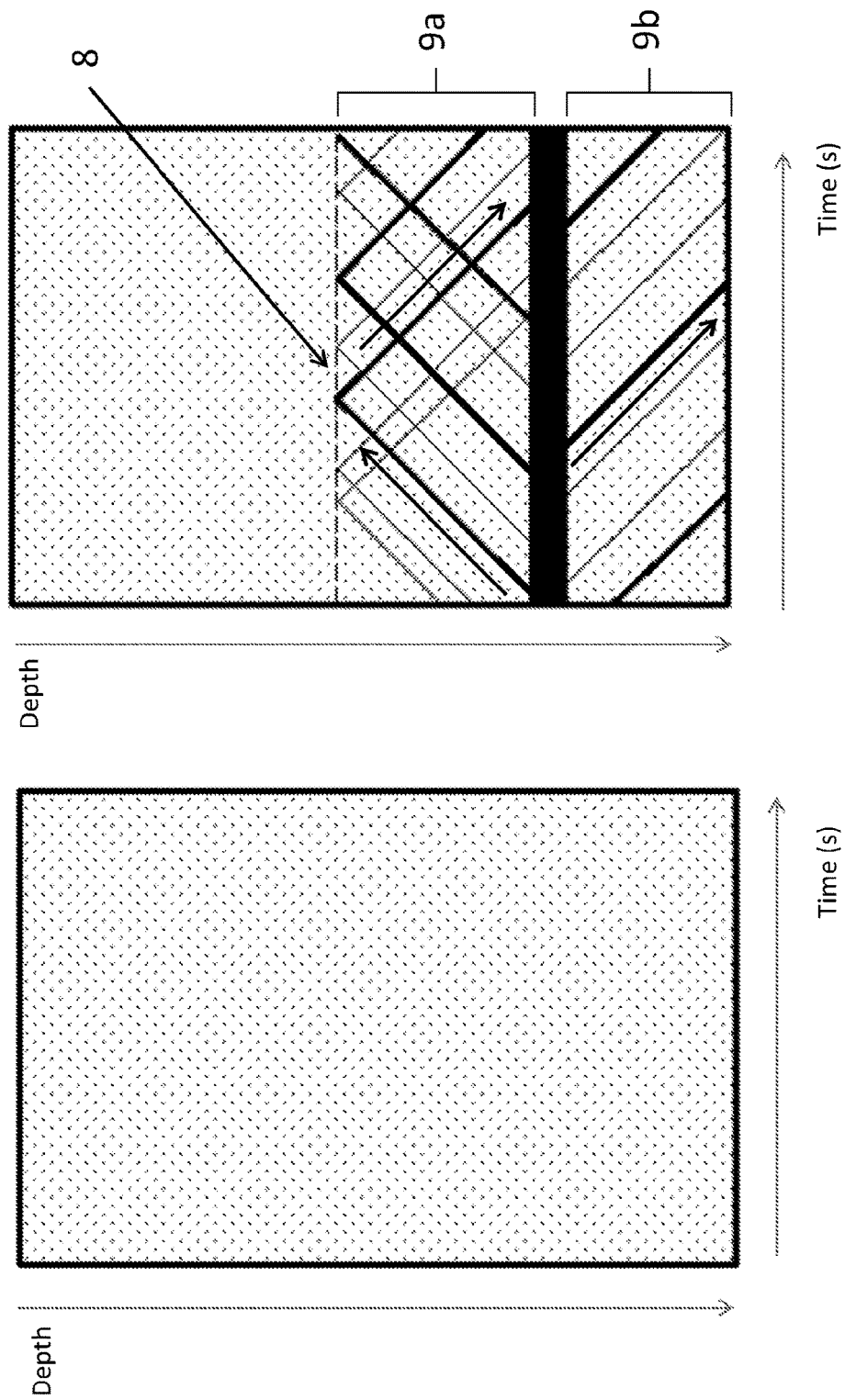
Figure 4:
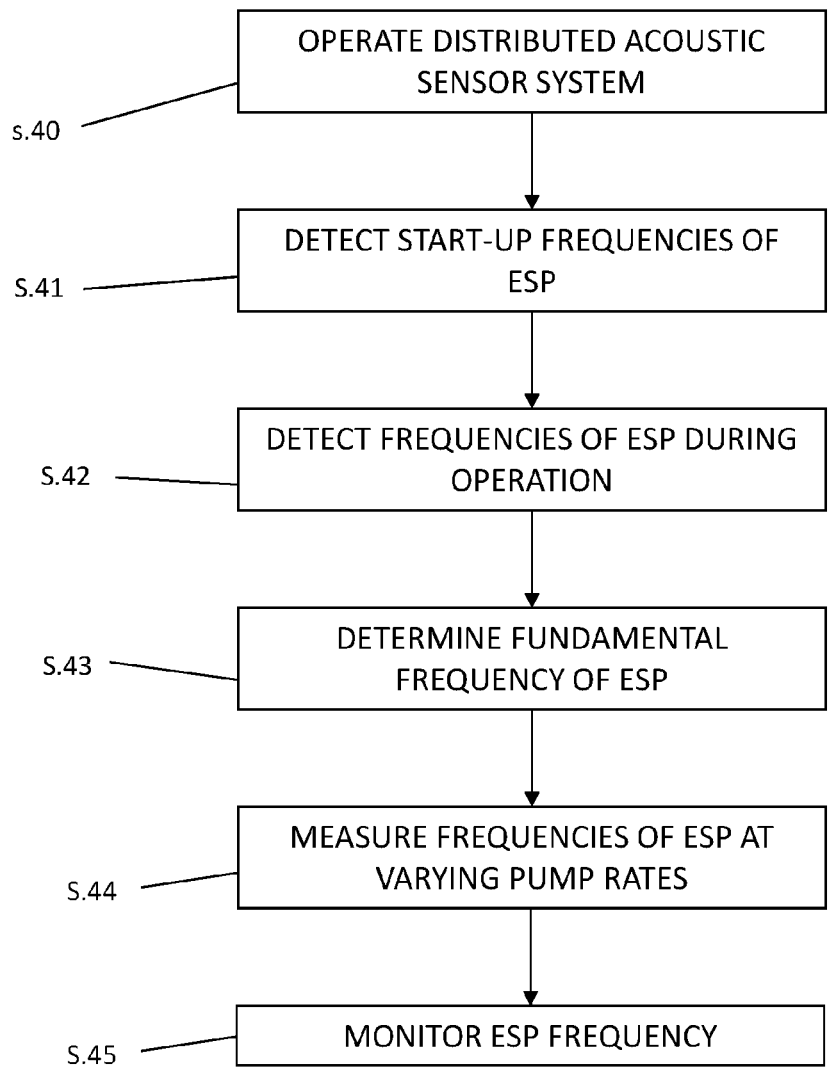
FIG. 4 is a flow diagram illustrating the typical steps employed in one aspect of an embodiment of the present invention.

FIG. 4 provides a flow diagram illustrating an example sequence of operations in the first embodiment of the present invention, given the equipment described above. In particular, at s.40 monitoring of the ESP using the distributed acoustic sensor system 1b is commenced. During the monitoring period the distributed acoustic sensing system is able to monitor the operating frequencies of the ESP 2 during start-up, as in s.41, and during steady state operation, as in s.42, the results of which are demonstrated by way of example in FIG. 2. Upon start-up, the ESP 2 generates start-up frequencies 6 that increase rapidly, and then stabilize as the ESP commences operation. As shown, the operating frequencies 7 stay at a steady frequency or frequencies for the duration that the ESP is operating normally. The distributed acoustic sensing is able to determine the ESP's fundamental frequency at s.43, that is, the lowest frequency at which the ESP operates, and measure the magnitude of different operating frequencies 7 at different pump rates at s.44. Continuous monitoring of the operation of the ESP over extended periods of time is possible, as shown by s.45.

From this diagnostic monitoring the distributed acoustic sensing system 1b is able to determine the condition and the performance of the ESP. Firstly, any changes or irregularities in the ESP operation frequencies 7 can be identified and used to help to determine any defects or problems with the ESP. Secondly, the ESP frequency is directly proportional to its pump rate, and so the ESP pump rates may be controlled, via monitoring of the operating frequencies 7, such that the ESP 2 generates optimal reservoir drawdown, that is to say, optimal production rate is achieved.

A second embodiment of the invention will be described with respect to FIG. 5. The second embodiment relates to monitoring the annulus fluid level in the vicinity of an ESP, using an optical fiber DAS. In this respect, in order to protect an ESP it is important that there is liquid around the ESP during its operation. Within the second embodiment the DAS system is used to monitor liquid levels around the ESP.

Figure 5:
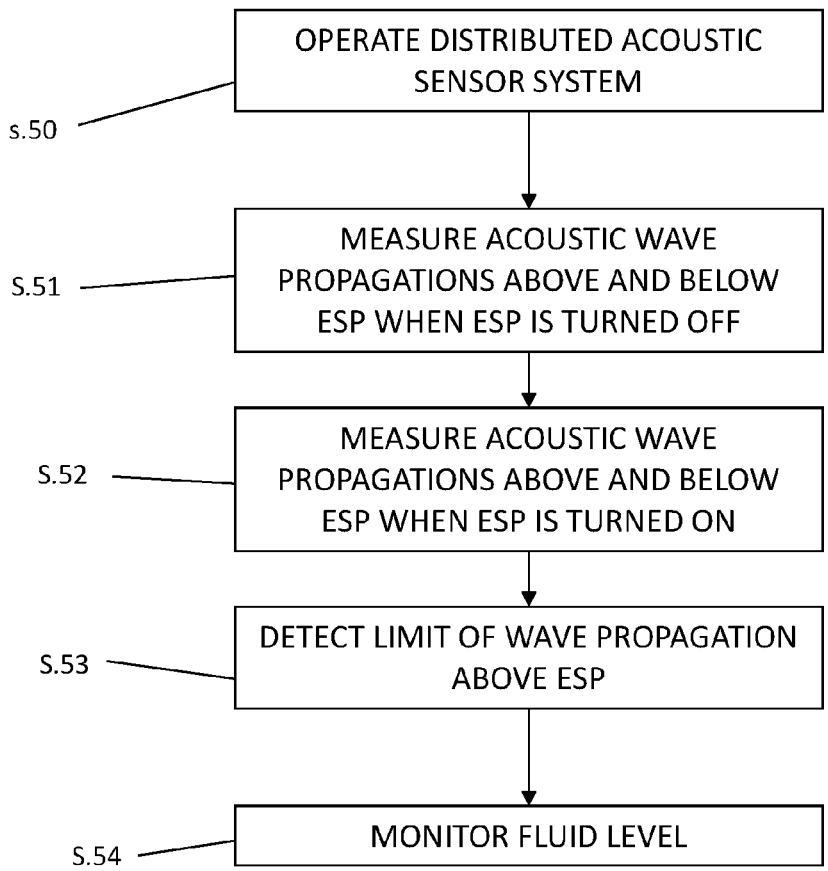
FIG. 5 is a flow diagram illustrating the typical steps employed in a further aspect of an embodiment of the present invention.

FIG. 5 provides a flow diagram illustrating the sequence of operations in the present embodiment, given the equipment described above. In particular, at s.50 the distributed acoustic sensor system 1b is operated in order to monitor the annulus fluid level 4 within the casing 3b, as shown in FIG. 1. To monitor the annulus fluid level 4, in one embodiment the ESP 2 is used as an acoustic source and the distributed acoustic sensor system used to measure the acoustic wave propagations above and below the ESP 2, as given in s.51 and s.52, and to identify any acoustic signal reflections from fluid interfaces 4 within the casing 3b. In other embodiments, however, and particularly when the ESP is not operating, other acoustic sources may be used as the acoustic illumination that is detected by the DAS. For example, acoustic energy from external sources can be coupled into the well, and used as acoustic illumination to determine the fluid levels. Such external acoustic energy may be naturally occurring, or result from external events such as seismic surveying. Alternatively, sound sources from within the well itself might be used. For example, where fluid is flowing within the pipe, flow noise from the fluid might be used (if loud enough), or alternatively synthetic noise sources such as clickers driven by fluid flow, or electrically driven sounders may be used to provide a sound source. Whichever sound source is used, it needs to be loud enough in the vicinity of the ESP so that it is detectable by the DAS, so that the DAS can determine the annulus fluid level around the ESP.

In more detail, the distributed acoustic sensor system $1b$ measures any acoustic wave propagations within the casing $3b$ when the ESP 2 is turned off, wherein the acoustic signal is measured both above and below the pump. As shown in FIG. $3a$, in this example there are no propagating acoustic signals detected within the casing. Detection of any acoustic signals at this point may indicate that there is a problem with either the ESP 2 or the well as a whole, for example, an external disturbance. The ESP 2 may then be turned on, and at s.52 the distributed acoustic sensing system $1b$ is able to measure acoustic wave propagations generated by the ESP 2, above and below the ESP 2, as before. FIG. $3b$ provides an example of such measurements. Above the pump, acoustic waves are seen to propagate up the well to a fluid interface 4, and then back down the well $9a$, reflected from the interface 4. Below the pump, acoustic waves are seen to propagate down the well $9b$. At s.53, the limit of acoustic wave propagation 8 may be determined, that is, the height at which acoustic waves above the pump $9a$ propagating up the well are reflected back down from the fluid interface. This limit 8 is due to a reflection effect, wherein the acoustic waves reflect and/or refract from the fluid interface 4 within the annulus.

In performing the above, the distributed acoustic sensing system $1b$ is able to monitor any changes in the fluid level within the casing $3b$ around the ESP. This is particularly important to ensure that the ESP 2 remains submerged in fluid, and does not become subject to a gas locking event in which free gas is induced and interferes with the operation of the ESP 2 or any of its components. The liquid surrounding the ESP 2 protects the pump by preventing it from overheating or drying out, and thus preventing damage to the pump that would be costly to repair or replace. The present embodiment is therefore able to detect any unexpected changes in the fluid levels, for example due to superfluous gas, by ensuring that the ESP 2 has enough submergence, thus extending the life of the ESP 2.

Further embodiments of the invention relate to using the distributed acoustic sensor system $1b$ to determine fluid flow along an ESP activated well. An optical fiber DAS can provide flow profile data with great resolution, sometimes down to 1 m in the case of the Silixa iDAS™, but often around 5 m. In more detail, the noise internally generated by the ESP 2 can be coupled into the fluid within the fluid carrying structure, that is, the casing $3b$, so as to artificially acoustically "illuminate" the fluid and allow fluid flow above and below the ESP 2 to be determined. The sensed acoustic wave propagations can then be used to determine the speed of sound in the production fluid and thus the speed of fluid flow in the well. By measuring the speed of fluid flow, the efficiency of the ESP 2 can be monitored. For example, a decrease in the flow rate of the fluid may be an indication that the pump rate has decreased, which may be due to a fault in the ESP 2.

In order to calculate fluid flow velocity, the DAS system $1b$ is able to measure the phase of the acoustic signal coherently along the fibre optic cable, and transform the time and linear space (along the well) into a diagram showing frequency ($\omega$) and wavenumber (k) in k-$\omega$ space. FIG. 6 shows the time and space signal and FIG. 7 shows the corresponding k-$\omega$ space. Using the data in FIG. 7, a good fit for the speed of sound can be calculated, by determining the gradient of the diagonal lines. The frequency band over which the speed of sound can be determined is more than sufficient for compositional and flow characterization. With the DAS system the speed of sound can be evaluated over a large section of the well and, therefore, measure the distributed variations of the flow composition and characteristics along the well. The technique is particularly powerful for determining the composition of the flow, for example, gas has a speed of sound of around 600 m/s whereas water has a speed of sounds around 1500 m/s.

Using such k-$\omega$ analysis, the speed of sound can also be determined throughout the entire length of the well. Importantly, each of the two diagonal lines shown in the k-$\omega$ space of FIG. 7 corresponds to the speed of sound either travelling up or down the well. These two lines can be analysed to reveal the Doppler-shifted sound speeds for upward and downward propagating sound within the fluid of interest. The measured determined speeds of sound can then be used to determine the flow speed of the production fluid, which is seen to vary with depth in the well corresponding to the change in hydrostatic pressure.

Figure 8:
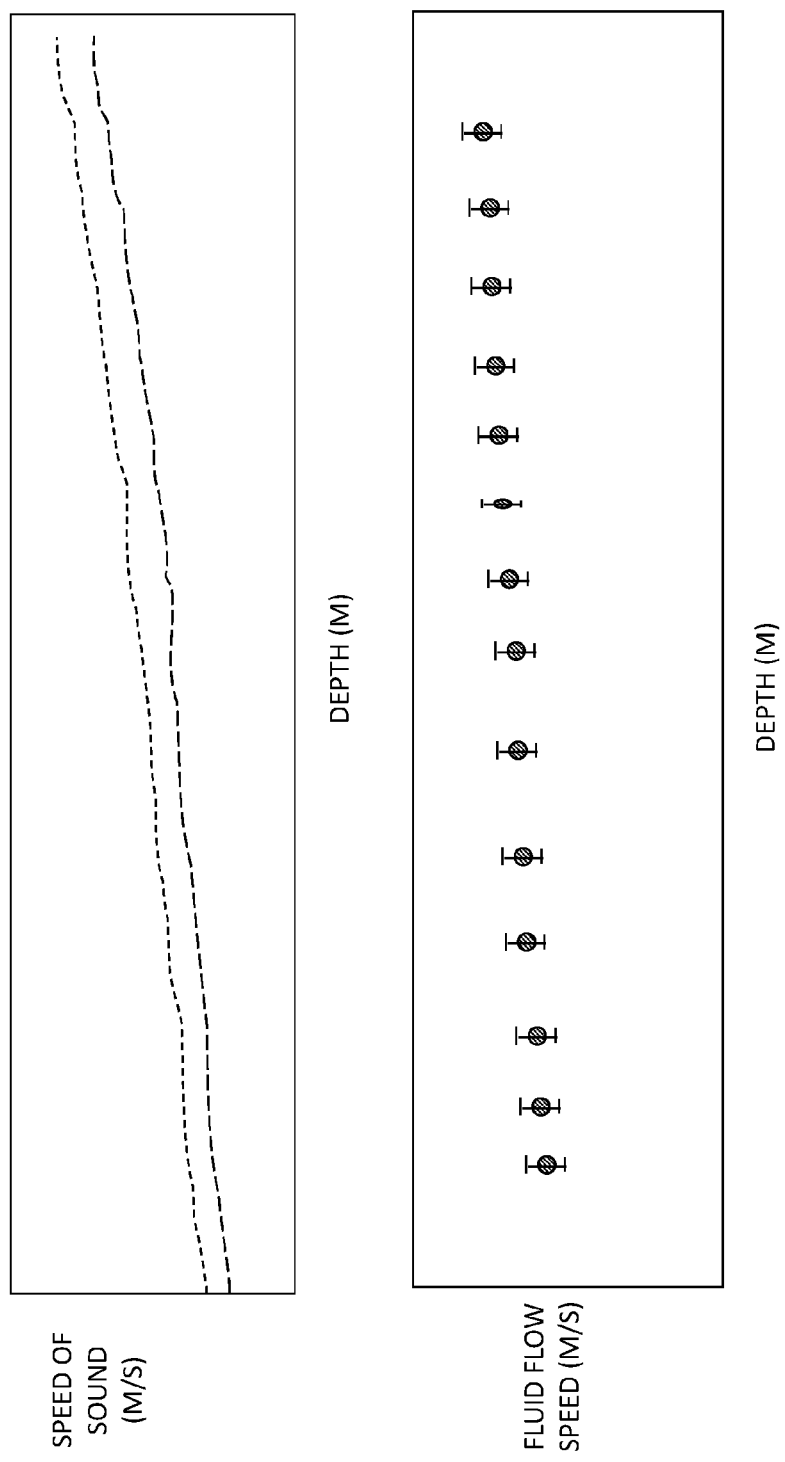
FIG. 8 is a graph showing upwards and downwards speed of sounds in a pipe, (top) together with calculated Doppler shifts (bottom) that provide fluid velocity measurements.

FIG. 8 shows the distributed flow determined in a gas injector based on Doppler shift measurements for a 30 s sampling. The determined flow speed varies with depth in the well corresponding to the change in hydrostatic pressure for a section of tubing with a uniform inner dimension and a gradually sloped well trajectory. In total the instantaneous and locally determined flow is roughly within +/−0.3 m/s (that for this well is 10%) of the actual flow speed. The match to reference measurements is within the uncertainties of an instantaneous measurement, the fluid property and the distribution of the pressure drop within the well.

In further detail, it is possible to estimate the speed of a given flow by monitoring the speeds of sound within that flow. In this analysis, it is assumed that the flow direction is coincident with the array layout (e.g. the direction of arrival for acoustic signals is known to be 0 or 180 degrees). The main principle used is that any sound contained within the flow reaches each consecutive sensor with a certain delay. Knowledge of the spatial sampling (i.e. the distribution of the cable along the well) can be used to calculate speed of sound by taking the ratio of average inter-sensor time difference of arrival and the average spatial distance between sensors. This operation can be easily done in the frequency domain. To perform this operation, in one embodiment one constructs a space-time plot of the signal across a neighbourhood of sensors. The 2D Fourier Transform of information this will give a wavenumber-frequency (k-$\omega$) plot.

If the speed of sound is constant across all frequencies (i.e. there is no dispersion) then each frequency ($\omega$) of a signal will correspond to a certain wavenumber (k) on the k-$\omega$ plot. Thus ideally a space-time signal will be mapped into a single straight line on the k-$\omega$ plot. From the wave equation we know that kc=w, where c is the speed of sound. So estimating the slope of the line of highest energy on the k-$\omega$ plot will give us the speed of sound in the medium.

Since the waveguide can sustain propagation both along and against the direction of flow, the k-$\omega$ plot can show two slopes for each mode of propagation: one positive and one negative. As the slope of each of these lines indicates the sound speed in each direction, the Doppler method can be used to derive the speed of sound from the 2D FFT according to the well-known method of analysis below.

$c+=c+v$ [speed of sound along the flow]

$c-=cv$ [speed of sound against the flow]

c+ and c− are found as slopes on a k-ω plot. Combination of the two equations above gives the flow speed (Ev$^1$) as v=(c+−c−)/2.

Please note that whilst the above description makes use of processing using k-ω plots, in other embodiments different processing may be undertaken to achieve the same results, and not all embodiments of the invention are required to use the k-ω techniques described.

A third embodiment of the invention will be described with respect to FIG. 9. The third embodiment relates to monitoring the annulus fluid level in the vicinity of an ESP using the speed of sound measurements made by the DAS system 1b, as described above. As stated previously, it is important that there is liquid around the ESP during its operation in order to protect an ESP. Within the third embodiment the DAS system 1b is used to monitor liquid levels around the ESP.

Figure 9:
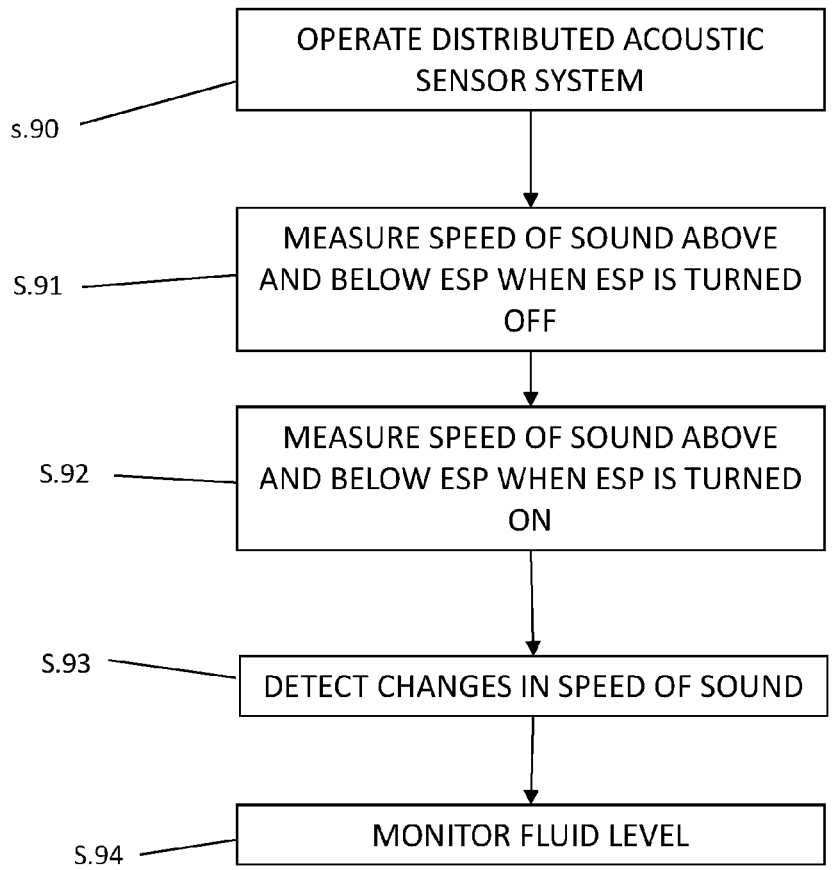
FIG. 9 is a flow diagram illustrating the typical steps employed in a further aspect of an embodiment of the present invention.

FIG. 9 provides a flow diagram illustrating the sequence of operations in the present embodiment, given the equipment described above. In particular, at s.90 the distributed acoustic sensor system 1b is operated in order to monitor the annulus fluid level 4 within the casing 3b, as shown in FIG. 1. To monitor the annulus fluid level 4, in one embodiment the ESP 2 is used as an acoustic source and the distributed acoustic sensor system 1b used to measure the speed of sound above and below the ESP 2, as given in s.91 and s.92, and to identify spatially abrupt changes in the speed of sound as a result of impedance mismatches as acoustic energy from the ESP 2 couples into the wall of the casing 3b and production well 3a. For example, the distributed acoustic sensor system 1b is used to identify a change in speed of sound as a result of weak coupling of the acoustic energy into the wall of the casing 3b and production well 3a above the fluid interface 4. Alternatively, and particularly when the ESP is not operating, other acoustic sources may be used as the acoustic illumination that is detected by the DAS. For example, acoustic energy from external sources can be coupled into the well, and used as acoustic illumination to determine the fluid levels. Such external acoustic energy may be naturally occurring, or result from external events such as seismic surveying. Alternatively, sound sources from within the well itself might be used. For example, where fluid is flowing within the pipe, flow noise from the fluid might be used (if loud enough), or alternatively synthetic noise sources such as clickers driven by fluid flow, or electrically driven sounders may be used to provide a sound source. Whichever sound source is used, it needs to be loud enough in the vicinity of the ESP so that it is detectable by the DAS, so that the DAS can determine the annulus fluid level around the ESP.

In more detail, the distributed acoustic sensor system 1b measures the speed of sound when the ESP 2 is turned off, wherein the speed of sound is measured both above and below the pump. When the ESP 2 is turned off, there may be no speed of sound measurements made since there are no acoustic signals propagating within the casing. However, if any speed of sound measurements are made, this may indicate the presence of acoustic signals which at this point may indicate that there is a problem with either the ESP 2 or the well as a whole, for example, an external disturbance. The ESP 2 may then be turned on, and at s.92 the distributed acoustic sensing system 1b is able to measure the speed of sound as acoustic signals generated by the ESP 2 propagate within the casing 3b, the measurements being made above and below the ESP 2, as before. At s.93, changes in the speed of sound are detected, in particular, spatially abrupt changes in the speed of sound resulting from impedance mismatches above the fluid interface 4. Below the fluid interface 4, the acoustic energy emitted from the ESP 2 is coupled into the casing 3b and the production well 3a, aided by the presence of the fluid within the casing 3b. In contrast, there is significantly weaker coupling of the acoustic energy into the wall of the casing 3b and the production well 3a above the fluid interface 4 where there is an absence of fluid. Consequently, there is a reduction of high speed acoustic energy above the fluid interface 4 and, therefore, the point at which there is a spatially abrupt change in speed of sound indicates the location of the fluid interface 4.

In performing the above, the distributed acoustic sensing system 1b is able to monitor any changes in the fluid level within the casing 3b around the ESP. This is particularly important to ensure that the ESP 2 remains submerged in fluid, and does not become subject to a gas locking event in which free gas is induced and interferes with the operation of the ESP 2 or any of its components. The liquid surrounding the ESP 2 protects the pump by preventing it from overheating or drying out, and thus preventing damage to the pump that would be costly to repair or replace. The present embodiment is therefore able to detect any unexpected changes in the fluid levels, for example due to superfluous gas, by ensuring that the ESP 2 has enough submergence, thus extending the life of the ESP 2.

It should be noted that the same optical fiber DAS system can be used to perform any or all of the above described embodiments, substantially simultaneously. That is, once installed a DAS system is able to monitor the operation of the ESP by detecting and monitoring its operating frequencies, as well as detecting ESP sound coupled into annulus fluid to monitor fluid levels around the ESP, whilst at the same time using the same sound for fluid flow determination. Use of an optical fiber DAS system therefore provides for comprehensive monitoring of the status and operation of a submersible pump installed within a well.

In addition to speed of sound measurements, DAS can be used to determine flow rate by tracking eddies generated by turbulent flow as described previously. In this case densely spaced sensing fibre may be attached below or above the ESP as well as at different locations along the production tubing and/or casing.

The above embodiments describe determining the annulus fluid level in an ESP activated well, using a DAS to identify the fluid interface either by identifying acoustic reflections from the interface, or by identifying the step change in the speed of sound between the two acoustic conductive media either side of the interface. Within the above the acoustic energy source for the DAS can either be the ESP itself, or some other acoustic illumination source, such as flow driven clickers or sounders, electrically driven clickers or sounders, or some other acoustic illumination source, such as an external source such as a seismic pulse from nearby seismic surveying. In some embodiments the acoustic illumination may be fluid flow in the well itself, particularly where that flow is noisy. For example, noisy flow, for example from turbulent or non-laminar fluid flow, within the well may also provide sufficient acoustic energy to act as an acoustic illumination source. In view of the fact that is possible in some embodiments to use an acoustic illumination source that is not the ESP, in further embodiments of the invention the same techniques as described above may be used with such non-ESP acoustic illumination source(s) to provide for in-well fluid level detection, and particularly annulus fluid level detection in any well, whether it is ESP activated or not. That is, in such further embodiments in-well fluid level detection, and particularly annulus fluid level detection may be undertaken in wells that are not provided with an ESP.

In more detail, one quality measure that is often used for oil wells is the Productivity Index (PI). The PI of a well is an indicator of the ability of the reservoir to produce fluid flow in relation to the reservoir pressure and can be represented by, $$PI=\text{Production Rate}/(RP-BHFP)$$

where RP is Reservoir Pressure, and BHFP is Bottomhole Flowing Pressure. The Production Rate is measured in barrels of oil (bbl) per day i.e. bbl/d Knowing various parameters including the annulus fluid level and flow rate means that the productivity index can be determined. Typically a lower fluid level will indicate a lower bottomhole flowing pressure. Thus measuring the annulus fluid level per se in any well, whether ESP activated or not, can provide important information about the well.

In respect of measuring the in-well fluid level, and particularly the annulus fluid level in an ESP activated well for the purpose of determining PI, the above described embodiments may be used as described to determine the fluid level. In particular, conveniently the ESP may be used as the acoustic source, again as described previously.

Where no ESP is present, then again the above described embodiments may be used as described, but another source of acoustic energy should be used to provide acoustic illumination for the DAS. However, as described previously, various forms of acoustic illumination can be provided, such as mechanical or electrical clickers or sounders, flow-driven devices, noisy flow, or incident external acoustic energy, for example from seismic shots, that is coupled into the well from the surrounding ground.

With this further embodiment, therefore, it should be understood that the arrangements provided by embodiments of the invention can be used for in-well fluid level detection more generally, and in particular annulus fluid level detection, whether the well is ESP activated or not. The fluid levels thus detected can then be used in various calculations to determine one or more quality measures for the well, such as the Productivity Index mentioned above.

Various modifications to the above described embodiments, whether by way of addition, deletion or substitution, will be apparent to the skilled person to provide additional embodiments, any and all of which are intended to be encompassed by the appended claims.

The invention claimed is:

1. A method of in-well fluid level detection around an in-well submersible pump using an optical fiber distributed acoustic sensor having an optical fiber deployed in-well, the method comprising:
   a) measuring a propagation of acoustic waves within fluid in a vicinity of the submersible pump using the optical fiber distributed acoustic sensor, wherein the acoustic waves are generated by the submersible pump when in operation, the speed of sound of the acoustic waves being measured along a length of the optical fiber within the vicinity of the submersible pump to measure the propagation therefrom; and
   b) detecting an in-well fluid level by determining, in dependence on the measurements by the optical fiber distributed acoustic sensor of the propagation of the acoustic waves generated by the submersible pump, a location of a fluid interface within the well with respect to the submersible pump to thereby further determine whether the submersible pump is submerged in the fluid, wherein determining the location of the fluid interface in the well includes detecting a change in the speed of sound measurements, wherein a spatially abrupt change in the speed of sound measurements as a result of weak acoustic coupling is indicative of acoustic energy propagating above the fluid interface.

2. A method according to claim 1, wherein measuring the propagation of acoustic waves includes detecting one or more reflections of an acoustic wave.

3. A method according to claim 1, wherein determining the location of the fluid interface in the well comprises measuring the propagation of acoustic waves from a known location of the submersible pump to the fluid interface to determine the distance from the known location to the interface.

4. A method according to claim 1, wherein the propagation of acoustic waves generated by the submersible pump are measured below and/or above the pump.

5. A method according to claim 1, wherein the optical fibre distributed acoustic sensor is further arranged to measure one or more operating frequencies of the submersible pump.

6. A method according to claim 5, wherein the operating frequencies are measured during start-up and/or the operation of the submersible pump.

7. A method according to claim 5, wherein the optical distributed acoustic sensor detects any changes in the operating frequencies.

* * * * *